April 3, 1956  H. F. BAKEWELL  2,740,595
HELICOPTER WITH FUSELAGE-ENCIRCLING LIFT ROTOR MEANS
Filed March 15, 1952  5 Sheets-Sheet 1

HARDING F. BAKEWELL,
INVENTOR.

BY
ATTORNEYS.

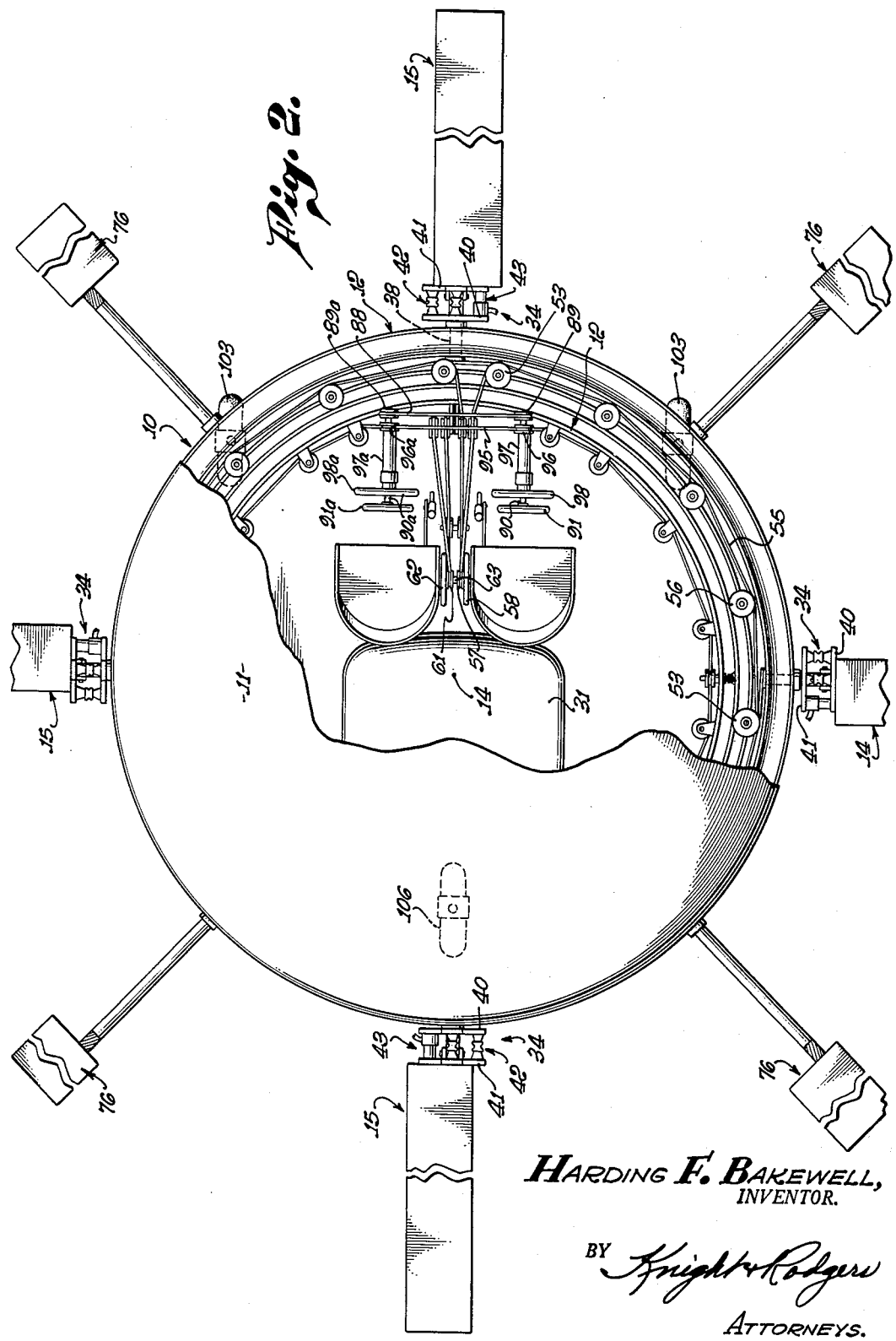

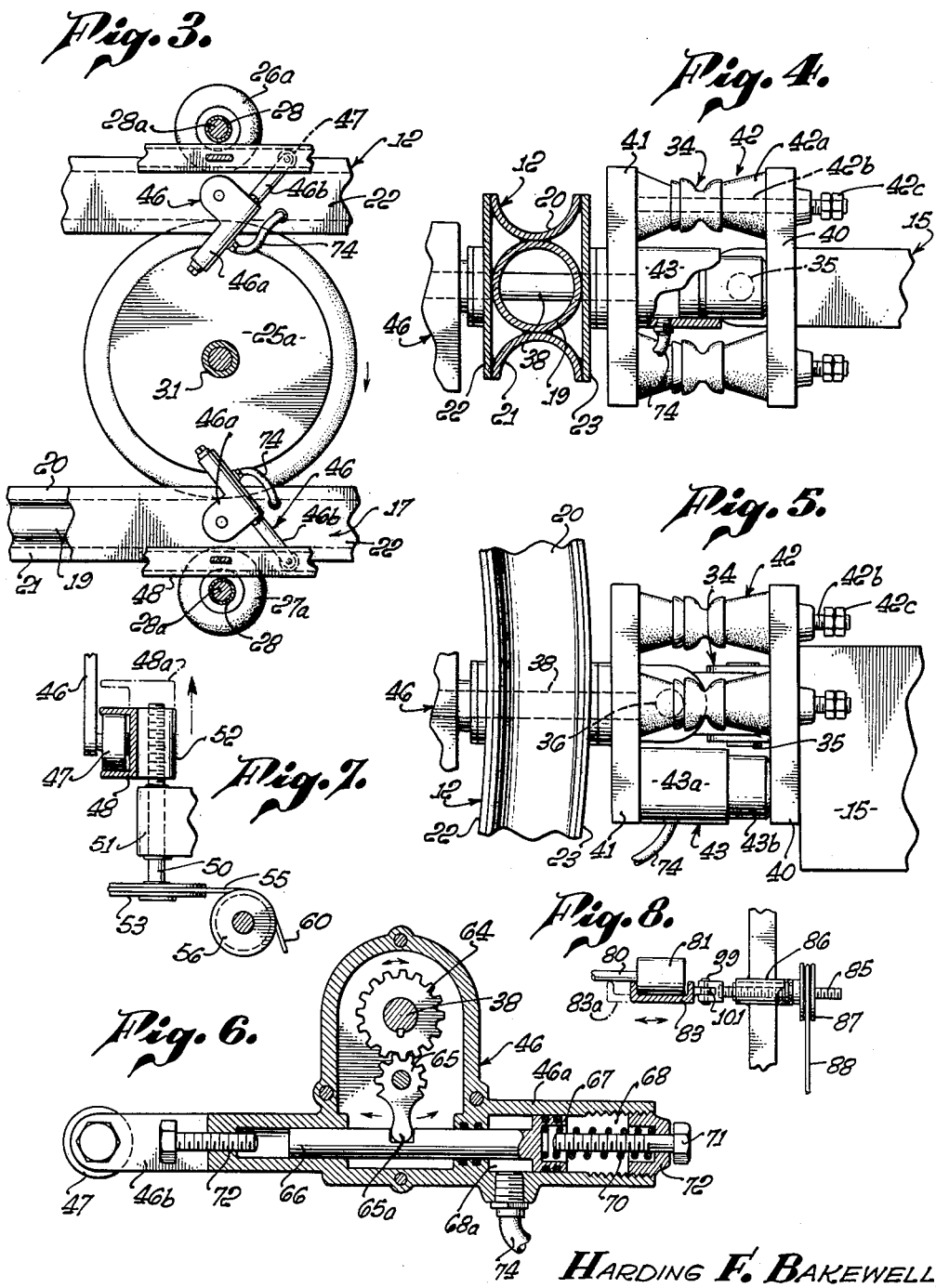

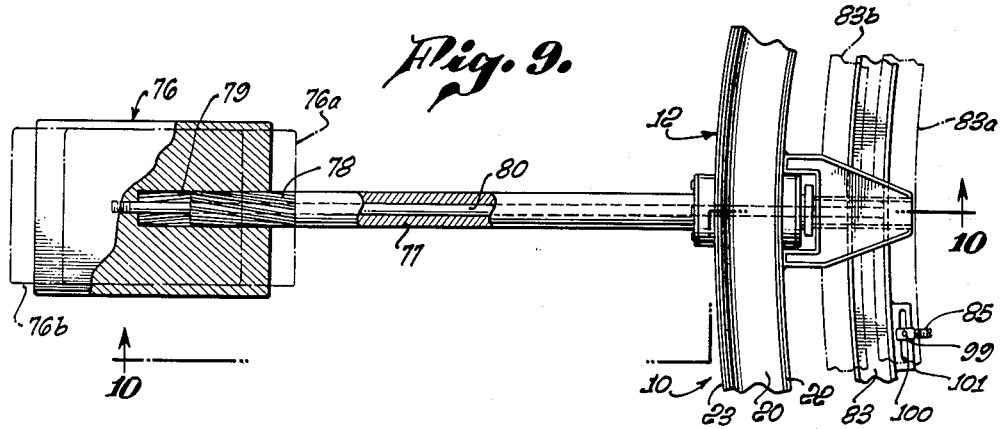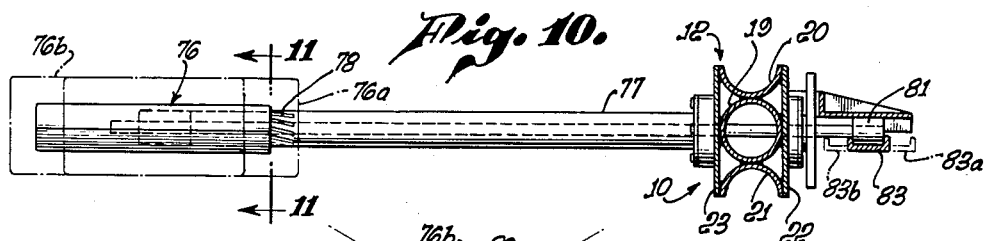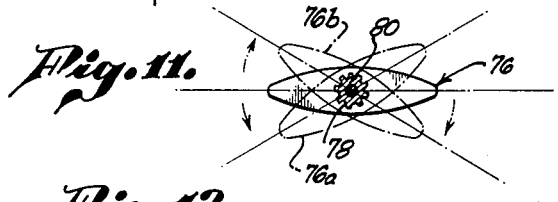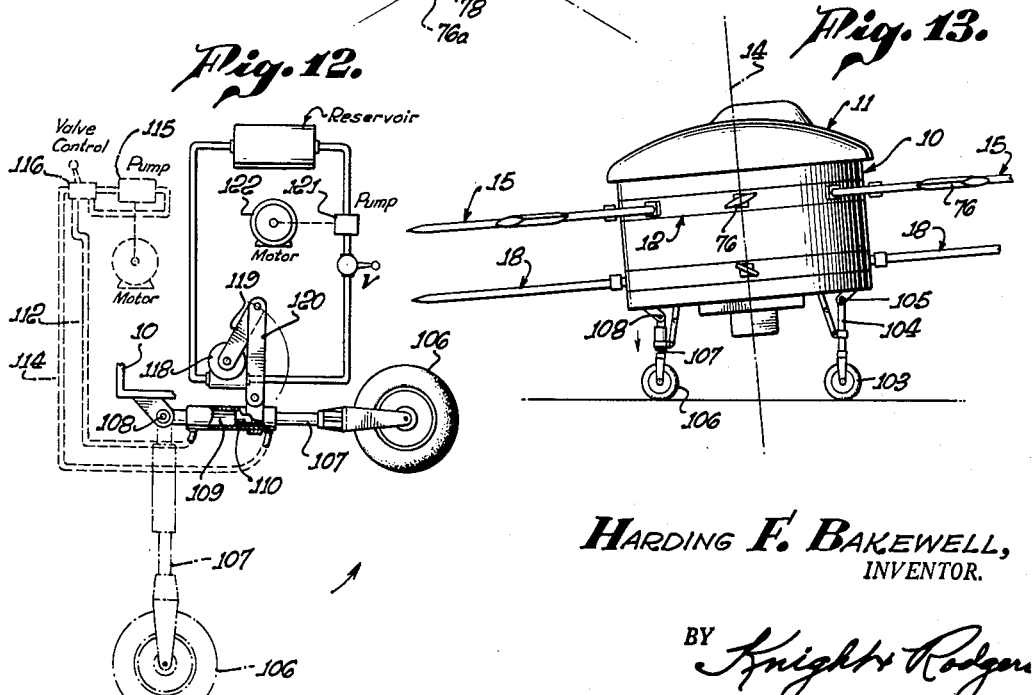

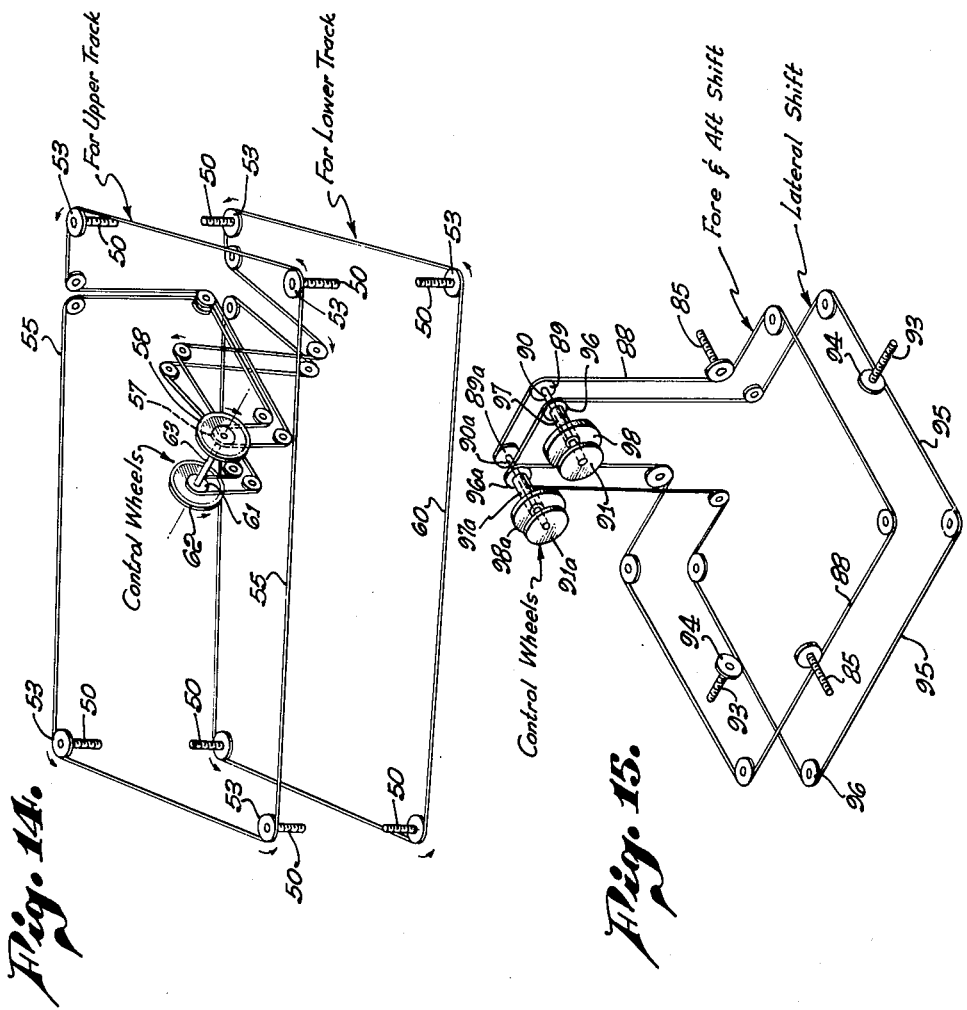

United States Patent Office 2,740,595
Patented Apr. 3, 1956

2,740,595

HELICOPTER WITH FUSELAGE-ENCIRCLING LIFT ROTOR MEANS

Harding F. Bakewell, Rancho Santa Fe, Calif.

Application March 15, 1952, Serial No. 276,859

16 Claims. (Cl. 244—17.11)

The present invention relates generally to aircraft and more especially to aircraft of the helicopter type.

In helicopters, blades revolve about a generally vertical axis to produce a vertical lift, but the lift is not uniform throughout each revolution because the lift increases with an increase in the net air speed of each blade and this air speed is continually changing. During one half of a revolution each blade has a component of motion in the direction of flight and during the other half revolution it has a component of motion opposite to the direction of flight; and these components are added or subtracted to the rotational speed to obtain the actual air speed of the blade. These components are greatest for any blade when it extends perpendicularly to the direction of flight. Differently stated, the absolute velocity of a blade in the direction of flight of the craft continually varies between a maximum at the position when the full speed of the blade is added to the speed of the aircraft and a minimum at a position 180° later when the blade speed is subtracted from the aircraft speed.

The result is a much greater lift at the side of the craft where the blades are advancing than at the other side, unless full compensation is made to equalize the lift around the entire revolution of the blades. Of course equalization of lift must be accomplished by automatic means, and has heretofore been accomplished by mechanisms that change the pitch of each blade as it revolves in such a manner that the pitch at any time depends on the angular position of the blade about its axis of revolution. At the same time the pitch of all blades is under manual control of the pilot in order to change the total lift of the rotor to cause the aircraft to ascend or descend.

In the usual rotor, the blades are connected to a hub member of small diameter compared to the maximum diameter of the rotor. The inner end of each blade is thus only a short distance from the axis of revolution and has but a comparatively low linear velocity. A unit length of blade at the outer end is several times more effective in producing lift than the same unit length when at the inner end of the blade because of the very low air speed close to the hub. Blades now are of the general magnitude of 10 to 15 feet long of which a portion near the hub is relatively ineffective to produce lift. At the same time it is not practical to substantially lengthen the blades to increase the total lift per blade because they then must be made heavier and thicker to withstand bending under the higher loading. The increased weight has various disadvantages.

With these conditions in mind it is a general object of my invention to provide a novel and advantageous rotating wing structure for a helicopter type of aircraft in which all parts of the blades are relatively more effective in producing lift, for a given blade length, than in conventional constructions.

It is also an object of my invention to provide rotating wing structure having a plurality of blades each of which is sufficiently removed from the axis of rotation to have a comparatively high air speed and so render the entire length of the blade more effective in producing lift.

It is an additional object of the invention to provide means for mounting and driving two rotating wing structures in opposite directions to neutralize the torque of each structure by the opposite and equal torque of the other wing structure.

Another object is to devise mounting and driving means for one or more wing structures that provides a shock-absorbent, vibration-free driving means.

Another object is to provide novel and advantageous mechanism for automatically and continually effecting a cyclic change in pitch of the individual blades in response to the air resistance encountered by each blade.

Another object is to provide novel means for collectively changing the pitch of the blades to regulate the total lift produced in order to cause the aircraft to ascend or descend.

A further object is to provide a novel and useful arrangement for determining and controlling the direction of flight of the aircraft, i. e., forwards, backwards, or laterally.

Still another object is to provide a novel arrangement for changing or controlling the heading of the aircraft.

These and other objects of my invention are attained in a helicopter of novel design by providing a fuselage around which a pair of vertically spaced, concentric rings revolve. Each ring carries a plurality of outwardly extending flying blades that provide the lift required to raise the craft; and the rings are driven in opposite directions about a common axis. This axis is referred to herein as a "normally vertical axis" since it is vertical, or substantially so, when the aircraft is at rest on the ground; however the axis may be tilted from the vertical, as when the craft is moving horizontally in flight, as described below.

The means for supporting and driving the rings comprises a plurality of sets of vertically spaced wheels. There are three wheels in a set with the center wheel engaging both rings. Power may be applied through one or more wheels of a set, the larger number affording greater power transmission, and also through more than one set of wheels if needed. The wheels are preferably rubber tired to get maximum frictional engagement with the rings carrying the flying blades. At the same time the rubber tires provide a shock and vibration absorbing construction that makes for a smooth driving mechanism. The ratio of the diameters of the rings and the driving wheels produces a speed reduction and simplifies the remainder of the power transmitting elements.

Each flying blade is connected to a ring by a universal joint allowing the wing to move to a limited extent about horizontal and vertical axes at the base of the wing. The blade mounting means also includes a pivot allowing the blade to rock about its longitudinal axis. This rocking movement is produced and controlled by a crank mechanism attached to the blade and engaging an annular track concentric with the axis of revolution of the blade around the fuselage. The track is adapted to being shifted along this axis to move simultaneously all the cranks engaging it. One such track is associated with each ring and controls collectively the pitch of all flying blades carried by the associated ring, movement of the track axially of the ring changing the pitch of all blades on the one ring simultaneously and equally. Movement of the ring is effected by the pilot through manual manipulation of suitable controls.

In addition, hydraulic means is incorporated in the crank mechanism of each blade to effect a change in pitch of the individual blade in response to movement of the blade about one of the axes of the universal joint. This movement is determined by the air resistance encountered by the blade as it revolves about the fuselage with the result that the pitch of the blade at any instant is determined in response to such air resistance and is varied to keep the lift of the blade substantially equal during each revolution. This cyclic change in pitch is effected automatically and for each blade individually.

On at least one of the rings, preferably the upper one, there is mounted a number of auxiliary blades for establishing the direction of flight. When set for uniform lift around the entire revolution, these blades have no effect, except to add to the total lift; but they can be adjusted to give increased lift over part of their rotational path and decreased lift over an opposing part. The unbalance in lift tilts the normally vertical axis of the fuselage and gives a horizontal component to the lift of the main flying blades which are now rotating in a plane inclined to the horizontal. The aircraft moves in the direction of the horizontal component; and the direction of flight is determined by controlling the relative position around the revolution of the blades at which the increase in lift of the flight direction blades is a maximum. This is accomplished by cam means that rocks the blades in proportion to longitudinal or axial movement of the blades that in turn is effected by connecting the blades to a second annular track. This track is movable by the pilot from a neutral position in which it is concentric with the axis of ring revolution to an eccentric position in which it causes the blades to move longitudinally as they revolve about the axis and track.

This flight directional means is effective only in the air; and to achieve the same result while the craft is on the ground I provide one or more adjustable struts in the landing gear that can be lengthened or shortened to tilt the axis of blade revolution with respect to the horizontal when the craft is to be taxied along a runway or the like.

To complete the steering control, there is provided a set of movable vanes against which is directed a stream of air to react against the vanes and thereby turn the aircraft to change or to maintain its heading. The air stream may be the stream of cooling air passing over the engine; and it is preferably exhausted beneath the aircraft to increase the available lift for raising and flying the aircraft.

How the above objects and advantages of my invention, as well as others not specifically referred to herein, are attained will be more readily understood by reference to the following description and to the annexed drawings, in which:

Fig. 2 is a plan view of the helicopter of Fig. 1 with a part of the roof broken away as well as parts of the various rotating blades;

Fig. 3 is a fragmentary section and elevation on line 3—3 of Fig. 1 showing means for driving and for rocking the flying blades;

Fig. 4 is an enlarged fragmentary view of a portion of Fig. 1 showing the means for mounting a single flying blade on a rotating ring;

Fig. 5 is a fragmentary plan view of the structure of Fig. 4;

Fig. 6 is an enlarged longitudinal section through the crank means constituting a part of the mechanism for automatically controlling the pitch of a flying blade;

Fig. 7 is an enlarged fragmentary section and elevation of a portion of the collective pitch control mechanism for the flying blades;

Fig. 8 is an enlarged fragmentary section and elevation of a portion of the cyclic pitch control mechanism for the flight direction blades;

Fig. 9 is an enlarged plan view of a single flight direction blade showing its mounting and its pitch control mechanism;

Fig. 10 is a combined elevation and section on line 10—10 of Fig. 9;

Fig. 11 is an end view of a single flight direction blade on line 11—11 of Fig. 10 illustrating the angular movement of the blade to vary its pitch;

Fig. 12 is a diagrammatic view of the hydraulic control systems associated with one of the landing wheel struts;

Fig. 13 is a side elevation at a reduced scale of a helicopter constructed according to my invention illustrating the position of the helicopter when moving forwardly on the ground;

Fig. 14 is a diagrammatic view of the control cables for the collective pitch control mechanism; and Fig. 15 is a diagrammatic view of the control cables for the manual pitch control mechanism for the flight direction blades.

Figure 1:
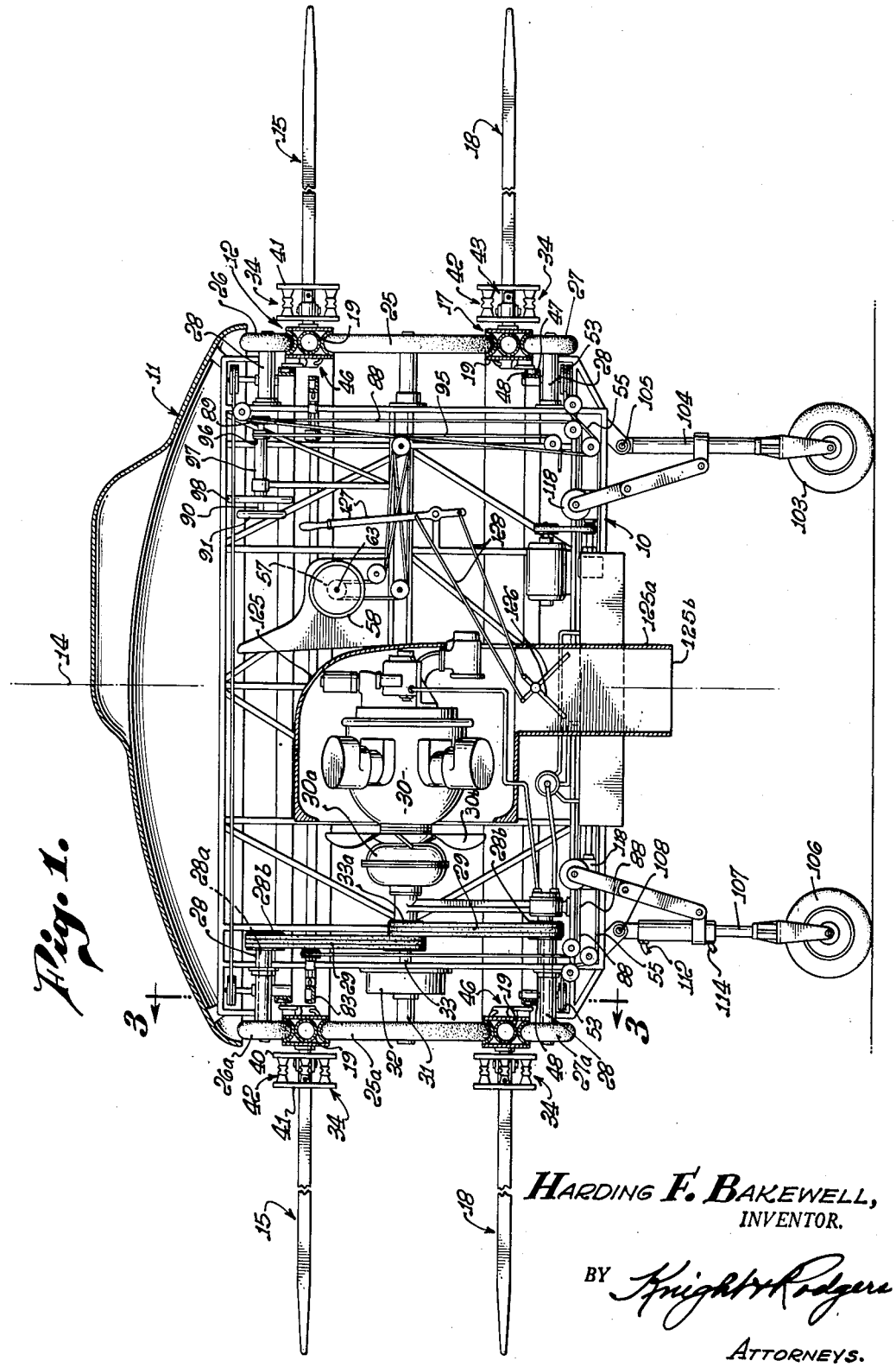
Fig. 1 is a vertical transverse section through a helicopter constructed according to my invention, with some parts broken away or shown diagrammatically for clarity and simplicity of illustration.

Referring now to the drawings, and particularly to Figs. 1 and 2, it will be seen that the helicopter type aircraft has a fuselage which is generally indicated at 10, and is covered by a transparent roof structure 11 which serves to protect the pilot from the wind. Fuselage 10 may be enclosed to a greater degree to form a cabin that protects the pilot and passengers of the aircraft, but the fuselage is here shown with a minimum of enclosure for reasons of simplicity.

Flying blade construction

As shown in Fig. 2, the fuselage is of circular outline when viewed in plan in order to accommodate my novel type of rotating wing structures. The upper rotating wing structure comprises upper ring 12 surrounding the fuselage and mounted thereon to rotate in a normally horizontal plane about axis 14 which is normally vertical when the aircraft is at rest, and a plurality of flying blades 15 mounted on ring 12 to be revolved around the fuselage by the ring. Blades 15 provide lifting power for raising the helicopter vertically and are referred to herein as flying blades since their primary purpose is to render the aircraft airborne and they are thus distinguished from blades later to be described which are used for steering or determining the direction of flight.

A second or lower similar wing structure is preferably provided comprising ring 17 which surrounds fuselage 10 near the lower portion thereof and is adapted to rotate in a plane parallel to the plane of ring 12 and also about the normally vertical axis 14. A plurality of flying blades 18 are attached to ring 17, these blades also supplying lift for rendering the aircraft airborne. Blades 15 and 18 are not shown in detail since they are airfoils of any conventional design and their exact shape is immaterial to the present invention. Blades 15 may be the same as or differ from blades 18, as desired. It is contemplated that the two sets of blades will be designed to have equal resistance to rotation so that the torque reaction to one set will be equal and opposite to that of the other set when they rotate at equal speeds in opposite directions about axis 14. For this reason two sets of counter-rotating blades are preferred, though it is within the scope of my invention to provide but one set.

The construction of ring 12 may be better understood by reference to Fig. 4, although my invention is not necessarily limited to this particular construction or design for the ring. Viewed in cross section, the ring comprises tube 19 with one-half of a similar tube attached both above and below, as indicated at 20 and 21 respectively. A pair of parallel, vertical side plates 22 and 23 are fastened to members 19, 20 and 21 to give added strength and rigidity to the ring. Viewed in plan (Fig. 2), the entire ring is circular in outline and is made to a radius suitable to encircle fuselage 10.

The details of construction of ring 17 are the same as those of ring 12.

The two rings 12 and 17 are mounted on the fuselage structure to rotate around it by combined supporting and driving means comprising a plurality of sets of rubber-tired wheels arranged at intervals around the fuselage. Four equally spaced sets are provided, of which two are shown in Fig. 1. For each ring the rubber-tired wheels may be considered as being arranged in vertically spaced pairs; but since there are two rings the wheel intermediate the two rings can engage both rings. Thus a complete set numbers only three vertically aligned wheels, one large intermediate wheel 25 and two smaller upper and lower wheels 26 and 27. The minimum number of sets of wheels is three sets of three wheels each angularly spaced about axis 14 at intervals of less than 180° between sets though it is preferable to space the sets equally. Any desired larger number of sets of wheels may be used.

These wheels for supporting rings 12 and 17 are arranged in an upper row composed of wheels 26, an intermediate row of the large wheels 25, and a third lower row of wheels 27. Each of wheels 25, 26 and 27 is rotatably mounted upon fuselage 10 by a suitable bearing so that the wheel rotates about a horizontal axis. Wheels 26 and 25 of each set are spaced apart sufficiently that they engage between them upper ring 12 and wheels 25 and 27 similarly engage lower ring 17. It will be seen that each of the two rings is provided with upwardly and downwardly facing surfaces that face along or in the direction of the axis of ring rotation and are engaged by the supporting wheels. It is preferred that these surfaces on the ring be outwardly concave, although it is not necessary that they be semicircular as shown, since this configuration of the surface of members 20 and 21 provides a greater area of contact between the ring and the rubber-tired wheels. This large surface area in mutual engagement is of particular importance in driving the rings.

As shown particularly in Fig. 1, the set of wheels 25a, 26a and 27a located at the rear of the aircraft is also part of the ring driving means as well as the supporting means and is drivingly connected to internal combustion engine 30, or any other suitable type of power plant, which is mounted in and upon the fuselage. Driving wheel 25a is mounted upon a drive shaft passing through sleeve housing 31 which supports suitable bearings for the shaft and is supported by the frame of fuselage 10. The drive shaft within housing 31 is the output shaft of a change speed transmission 32 which may be of any suitable type effecting a speed reduction and reversal of direction of revolution between output and input shafts. The speed reduction and change in direction are done in order to match the peripheral speed and direction of movement of wheels 25a and 27a which also are driving the two rotating wing structures. The input shaft 33 to transmission 32 is connected to engine 30 through some suitable type of clutch mechanism, such as the fluid clutch indicated at 30a.

Each of drive wheels 26a and 27a is mounted on a drive shaft 28a enclosed within a housing 28 attached to the fuselage frame. The inner end of each drive shaft 28a carries a driven pulley 28b over which passes a series of roller chains or belts 29. The two sets of drive chains 29 also pass over a pair of driving pulleys 33a mounted on drive shaft 33. A belt type drive is selected here as it is simple in construction, and gives proper direction of rotation to wheels 26a and 27a without a complicated set of gears. The usual type of reduction gearing can be dispensed with in this type of design since adequate speed reduction is afforded by the ratio of the diameters of drive wheels 25a, 26a and 27a to the diameter of rings 12 and 17.

The amount of power which can be transmitted from the driving wheels to each of rings 17 and 12 is limited by the character of the frictional engagement between the driving and driven members. For this reason it is preferred to place around the drive wheels a rubber tire or similar member which has a relatively high coefficient of friction and to shape the contacting faces of each ring so as to provide a maximum area upon the ring in engagement with the tire. Another advantage of the rubber tires is that they afford a smooth, resilient, shock-absorbing drive means.

As shown in Fig. 3, wheels 25, 26 and 27 are vertically aligned in sets of three in order to engage and support each of the rotating rings between pairs of wheels. In each pair one wheel opposes the thrust of the other wheel against the ring. This arrangement improves the character of the frictional engagement by keeping at a maximum the possible pressure of the ring against each driving wheel. Also no forces tend to bend the ring as would be the case if the wheels were horizontally offset relative to each other. The total amount of driving force transmitted to each ring 12 or 17 may be increased by increasing the number of wheels to which power is applied, and to obtain high power transmission I prefer to apply power to all three wheels of one set. For lower power requirements, transmission 32 may be omitted and only the top and bottom wheels driven; or only the center wheel may be driven, omitting belts 29. It is also within the scope of my invention to apply power through more than one set of wheels.

Each of the two rings 12 and 17 has attached to it a plurality of airfoils or blades 15 or 18 respectively designed to produce lift as they are rotated about the fuselage by the rotating rings. Flying blades 15 are individually connected to ring 12 as shown in Fig. 1 by means of the universal joint mechanism shown in greater detail in Figs. 4 and 5. Blades 18 are connected to ring 17 in the same manner. The universal joint 34 includes horizontal pivot pin 35 and a vertical pivot pin 36 which establish respectively horizontal and vertical axes about which blade 15 may move relative to ring 12. The universal joint is connected to the ring by shaft 38 which extends through the ring to the inner side thereof and establishes a horizontal axis longitudinal of the blade about which the blade can be rocked, as will be described later.

At each universal joint is a pair of spaced abutment plates 40 and 41 attached one to each of the end members of the universal joint or, in effect, connected respectively to blade 15 and to ring 20. Interposed between the two abutments and spanning the universal joint at each blade are a plurality of yielding members 42 and 43 which are arranged in pairs to resist movement of blade 15 about either of pivots 35 or 36 and thus continually urge the blade to a neutral or normal radial position. There are three members 42 which are simple compression units and the fourth unit is a hydraulic unit as described below. Each unit 42 consists of two compression members or bumpers 42a of rubber or other similarly resilient material through which bolt 42b passes. A nut 42c on the end of each of these bolts limits the movement of abutment 40 away from the other abutment. Yielding members 42 and 43 are adapted to yield under compression forces resulting from forces applied to the blade by air pressure as the blade moves in normal flight in order to permit a limited movement of the blade about either or both of the axes established by horizontal and vertical pivots 35 and 36.

As shown in Figs. 1 and 4 one pair of the members 42 are disposed one above and one below the universal joint and come into action when blade 15 moves up or down about pivot 35. The third unit 42 and the unit 43 are horizontally spaced with respect to the universal joint, as may be seen in Fig. 5, and react to movement of the blade about vertical pivot 36. The unit 43 is placed on the rear or trailing side of the universal joint with respect to the direction of rotational movement of blade 15 in flight, for reasons which will be explained later.

*Collective pitch control mechanism*

In a helicopter, the amount of lift provided by an airfoil moving in a circular path, such as flying blades 15 and 18, is determined by the pitch or angle of attack of the airfoil. The pitch or angle of attack is changed by rocking the blade about its longitudinal axis; and in the construction herein illustrated that longitudinal axis is established for each blade by shaft 38 which passes through and is rotatably mounted in one of rings 12 or 17. In order to change the lift of all blades, means are provided for simultaneously rocking all the blades about their longitudinal axes; and this means is commonly referred to as collective pitch control means. It is manually controlled by the pilot while in flight to adjust the rate of climb or descent of the aircraft.

A novel and preferred form of pitch control mechanism is provided herein and comprises crank means 46 which is pinned or otherwise non-rotatably fastened to the inner end of each shaft 38. Crank 46 at one end carries guide roller 47 which, as shown in Figs. 1 and 7, engages annular track 48. Track 48 is in the form of a channel with its legs facing outwardly, the entire channel being bent into a circular form and mounted on the fuselage concentric with rings 12 and 17 and axis 14. There are two tracks 48, one for each ring; and each track is non-rotatably mounted on the fuselage but may be moved axially.

All of the crank means 46 on a given rotating ring are engaged by one track 48 which provides a pair of vertically spaced guiding surfaces between which are the several rollers 47. By raising or lowering upper track 48 in a direction axial thereof and relative to ring 12, all of the crank arms 46 are simultaneously and equally rotated about shafts 38 with the result that the pitch of all blades 15 is simultaneously and equally altered. The same is true of blades 18 on lower ring 17 when the lower annular track 48 associated with the lower ring is raised or lowered.

If it is desired to control the pitch of upper blades 15 independently of the pitch of lower blades 18, separate manually operated means may be provided for moving upper track 48 and lower track 48. Ordinarily pitch of both sets of blades will be changed at the same time and the two tracks are positioned simultaneously by substantially similar mechanism. This track moving mechanism includes a plurality of lead screws 50, of which one screw for lower track 48 is shown in Fig. 7. These lead screws are each rotatably mounted in a boss 51 which is held in fixed position by attachment to fuselage 10. A portion of each lead screw is threaded into a boss 52 attached to the inner face of track 48. I contemplate providing four or more such lead screws 50 spaced at intervals around each of the two tracks 48, as indicated diagrammatically in Fig. 14. Each screw 50 has attached to it pulley 53 over which passes a control cable. All lead screws 50 controlling upper track 48 are actuated by a single control cable 55 which, with the assistance of such idler pulleys 56 as may be necessary to obtain the required changes in direction of the control cable, passes over the pulleys 53 of the upper set of lead screws 50. As may be seen in Figs. 2 and 14, cable 55 passes over drum 57 attached to hand wheel 58 which is located at one side of the pilot's seat. Cable 55 is a continuous member so that tension may be applied to either run of the cable leading away from the drum by rotating hand wheel 58 in either direction; and by turning the hand wheel in the proper direction the pilot may either raise or lower upper track 48 to adjust the pitch of blades 12 as desired.

In order to adjust lower track 48 a second control cable 60 (Fig. 7) passes over the pulleys 53 attached to the lead screws controlling the position of lower track 48. Cable 60 is brought up over drum 61 attached to a second hand wheel 62 placed beside the pilot's seat. Hand wheels 58 and 62 are attached to a common shaft 63 so that rotation of one hand wheel turns the other equally. One or both hand wheels have a releasable clutch (not shown) of any conventional type connecting them to the common shaft so that either wheel may be turned independently of the other. This may be required, for example, to equalize the torque of the two rotating wing structures. The two hand wheels 58 and 62 may be placed in any other convenient position easily accessible to the pilot; and are placed close together in order that they may be moved independently or in unison.

Control cables 55 and 60 and the rest of the manually operated means for raising and lowering the two tracks are shown in a diagrammatic manner since their construction may take any one of several known forms. For example, pulleys 53 may be replaced by sprocket wheels which engage sections of chain composing parts of the control cable. This construction affords a more positive connection between the control cable and the lead screw. Although the control cables are shown in the drawings herein as engaging only a short arc of each of pulleys 53, it will be understood that it is within the scope of my invention to lengthen the arc of engagement in order to increase the frictional drive, by adding idler pulleys suitably disposed.

*Automatic cyclic pitch control mechanism*

The crank means 46 may, in a simplified design, be simple arms or levers; but it is desired to incorporate in each lever hydraulic means adapted to rock the associated blade 15 to change its pitch automatically in response to varying air pressure on the blade. This is designed to compensate automatically for the change in lift that otherwise occurs when the blade is retreating with respect to the direction of flight as compared with the lift when it is advancing. The hydraulic means incorporated in each crank means 46 is a part of the entire means for automatically changing the pitch of any blade in response to the changing air resistance encountered by the blade as it makes a complete revolution around fuselage 10.

Taking up first the construction of this special form of crank means 46, it will be seen from Figs. 3 and 6 that each crank means is in the form of a housing 46a within which is spur gear 64 that is keyed or otherwise non-rotatably attached to the end of shaft 38. Spur gear 64 meshes with quadrant gear 65 pivotally mounted inside the housing and having an arm 65a which is pivotally connected to piston rod 66, as by inserting the arm in a notch in the rod. At one end piston rod 66 is provided with piston 67 which reciprocates within cylinder 68 formed within a portion of the housing 46a. The piston and housing are preferably provided with O-rings or other suitable packing means as indicated in order to obtain a fluid tight seal between the piston and rod and the engaging walls of the housing.

Compression spring 70 is interposed between the end of piston 67 and the outer end of cylinder 68 and normally urges the piston and piston rod to the left as viewed in Fig. 6. The amount of travel of the piston and piston rod to the right against the spring can be adjustably limited by stop screw 71 threaded into plug 72 closing the end of cylinder 68 and adapted to engage piston 67. Movement of the piston rod to the left as urged by spring 70 may be adjustably limited by another stop screw 72 threaded into the opposite side of the housing and engaging the piston rod to determine the end of its travel. Housing 46a has an outwardly extending arm 46b on which is rotatably mounted roller 47 that engages an annular track 48 in the manner described above.

Assuming that piston rod 66 is held fixed in position with respect to housing 46a, both gears 64 and 65 are locked against relative rotation. Hence, movement of the housing about the axis of shaft 38 rocks the shaft about its axis. Movement of roller 47 caused by lowering or raising track 48 swings the roller and crank 46 in an arc about the axis of shaft 38; and as long as piston rod 66 is in a fixed position shaft 38 is also moved through the same angle about its own axis as roller 47 is moved. On the other hand, longitudinal movement of piston rod 66 relative to housing 46a rotates quadrant gear 65 about its own pivot and this pivotal movement is transmitted to spur gear 64 to produce angular movement of gear 64 and shaft 38 about the axis of the shaft without causing any angular movement of crank means 46 about the shaft axis.

This relative movement of piston rod 66 in housing 46a is produced and controlled hydraulically by hydraulic fluid introduced into cylinder space 68a at the side of piston 67 away from compression spring 70. This cylinder space 68a is connected by fluid conduit means, such as hoseline 74, to the hydraulic cylinder unit 43 of the associated blade 15. Unit, 43 previously described as a yielding member comprises a fixed cylinder 43a attached to abutment plate 41 and a movable piston 43b sliding in the cylinder and bearing at one end against the other abutment plate 40. Piston 43b has a fluid tight engagement with the walls of cylinder 43a. The cylinder is filled with hydraulic fluid which is subjected to pressure by piston 43b.

It will be recalled that the yielding unit 43 is located at the universal joint on the trailing side of airfoil 15. The resistance to movement through the air encountered by the airfoil as it rotates normally tends to swing the airfoil rearwardly about the vertical axis of pivot 36; and this movement is resisted by engagement of piston 34b with abutment plate 40. This resistance on the part of piston 34b exerts pressure on the fluid in cylinder 43a and this fluid pressure is transmitted through line 74 to cylinder space 68a where the fluid pressure in turn exerts a force on piston 67 tending to move the piston in the direction to compress spring 70. When blade 15 encounters resistance above a predetermined value, as established by the strength of spring 70, this force on the blade increases the hydraulic pressure in cylinders 43a and 68a and moves the piston and piston rod to the right, compressing spring 70. This occurs during that portion of each revolution when the blade is moving in the direction of flight and resistance to movement is at a maximum. As explained before, movement of the piston rod causes rotation of shaft 38 about its own axis but without any movement of crank means 46, thus varying the pitch of a single blade independently of the pitch of the others. The parts are so designed that the movement of shaft 38 in response to high air resistance on a blade 15 is in a direction to rock the blade towards a smaller angle of attack which decreases its lift and also the air resistance which it encounters as it moves around the fuselage.

Conversely, when the resistance encountered by airfoil 15 falls below its maximum, as when the blade is moving rearwardly with respect to the direction of the flight of the aircraft, a reverse movement of piston rod 66 takes place. The reduced force exerted by plate 40 on piston 43b allows movement of piston 43b in a direction to expand the space occupied by fluid within cylinder 43a, thus allowing spring 70 to drive piston rod 66 to the left in Fig. 6. Movement of rod 66 rocks shaft 38 about its axis, changing the pitch of the associated blade 15 independently of the pitch of the other blades. This time the change in pitch is in a direction to increase the angle of attack which increases the lift of the blade and accordingly builds up the resistance it encounters as it moves through the air.

The pitch control means just described is cyclic in character since it operates to change the pitch of a specific blade during each revolution of the blade around fuselage 10. Also, it is entirely automatic in its operation being governed only by the resistance to rotational movement encountered by the blade during normal rotation. Individual cyclic pitch control means is provided for each of the flying blades 15 and 18 and operates to adjust the pitch of the blade independently of the pitch of the other blades and independently of the manually operated collective pitch control means earlier described.

The piston and cylinder unit 43 for each blade is here shown and described as being at the rear of the blade and responsive to movement of the blade in a horizontal direction. Actually the blade simultaneously undergoes an up and down movement about axis 35; and this motion of the blade can be used instead for changing the pitch. To do so, the unit 43 is placed at the top of the universal joint. This is the structure that would result from rotating the assembly of units 42 and 43 90° clockwise, viewed from the outside.

*Flight direction blades*

Control of the direction of flight of the aircraft is accomplished by manipulation of a plurality of flight direction blades 76, which are shown particularly in Figs. 2, 9 and 10, to tilt the fuselage and thereby tilt the plane of revolution of the flying blades. This is in contrast with conventional construction in which the plane of rotation of the main blades is tilted with respect to the fuselage in order to obtain the lateral component of the lift exerted by the blades which is utilized to control the direction of flight. Blades 76 are mounted upon upper ring 12 only and are each located midway between two successive flying blades 15. Since there are four of these latter blades, there are also four of the flight direction blades. Blades 76 are airfoils but are shorter than the flying blades since the total thrust required of them is considerably less.

Referring now particularly to Figs. 9 and 10, it will be seen that each blade 76 is mounted upon the outer end of sleeve 77 which is fastened at its inner end to the outer face of ring 12. Sleeve 77 extends radially outward from the rotating ring and lies in the common plane of the flying blades.

Blade 76 is mounted upon sleeve 77 for combined translational movement lengthwise of the sleeve and angular movement about the sleeve. This is accomplished by providing one or more spiral grooves 78 at the outer end of the sleeve which engage corresponding spiral ridges 79 on the blade. This spiral cam arrangement causes the blade to rock angularly about the axis of the sleeve in proportion to its movement longitudinally of the sleeve.

Movement of each flight direction blade longitudinally of sleeve 77 and radially of ring 12 is controlled by rod 80 which passes through the sleeve and is attached at its outer end to the blade. At its inner end, which is located radially inwardly of ring 12, rod 80 carries cylindrical collar 81 which rides in annular track 83. Annular track 83 is in the shape of an upwardly facing channel member with the two upwardly extending legs of the channel providing horizontally spaced surfaces in guiding engagement with the two end faces of collar 81. In this way, the radial position of channel 83 determines the position of collar 81 and operating rod 80 with respect to rotating ring 12.

Track 83 is located inside rotating ring 12 and is nonrotatably supported on the fuselage so that as the ring rotates collars 81 slide or roll around within track 83. The track simultaneously engages the collars of all four operating rods. In its neutral position, annular track 83 is concentric with ring 12 and axis 14; and the track is so mounted on fuselage 10 as to be adapted for bodily movement to a position eccentric with respect to ring 12 and axis 14. The movement of annular track 83 is in a plane parallel to the plane of revolution of blades 76.

Part of the means for shifting track 83 in this manner is illustrated in Fig. 8. Lead screw 85 is connected at one end to track 83 and is slidably mounted in sleeve 86 attached to a part of the frame work of fuselage 10. The hub or pulley 87 is a threaded nut which is screwed onto lead screw 85. Pulley 87 is held against movement away from sleeve 86 so that as the pulley revolves lead screw 85 is moved longitudinally within the sleeve. Since the lead screws 85 have their axes horizontal, their movement shifts track 83 horizontally in a plane parallel to the plane of ring 12.

As shown diagrammatically in Fig. 15, one lead screw 85 is located in the forward portion of the helicopter and a similar one at the rear at diametrically opposite positions on track 83. In this way the track can be shifted forwardly or rearwardly relative to axis 14. Control cable 88 passes over both pulleys 87 whereby equal movement in the same direction is imparted to both lead screws at the same time in order to shift the track 83. Control cable 88 passes over drive pulley 89 which is connected by shaft 90 to control wheel 91 disposed in front of the pilot, as shown in Fig. 15. A duplicate control wheel 91a attached to shaft 90a carrying a second drive pulley 89a may be provided for the co-pilot. Cable 88 is an endless member passing over both pulleys 89 and 89a in order that tension may be applied to the cable in either direction away from the drive pulleys in order to rotate pulleys 87 in either direction desired. Of course other means of interconnecting the two control wheels 91 and 91a may be provided if desired.

Since the two lead screws 85 are located at diametrically opposite positions relative to annular track 83, one at the front and one at the rear of the track, the apparatus just described moves the track in a front to rear direction only; or, in other words, it produces an eccentricity of the track with respect to axis 14 only in a forward or rearward direction. To move track 83 laterally, that is, to produce an eccentricity at one side or the other of axis 14, a second pair of lead screws 93 is provided, as shown in Fig. 15. These two screws are placed at diametrically opposite locations with respect to track 83 with their axes at right angles to the axes of screws 85. They are connected to the track in the same manner as lead screws 85, as shown in Fig. 8.

Each lead screw 93 has attached to it an operating pulley 94 and over these two pulleys pass control cable 95. The control cable is also threaded over such idler pulleys 96 as may be required to effect the necessary changes in the direction of the control cable. Cable 95 is operated by a mechanism similar to that provided for operating cable 88. Cable 95 passes over drive pulleys 96 and 96a which are attached respectively to sleeves 97 and 97a which in turn are rotatably mounted upon shafts 90 and 90a. The two sleeves are respectively connected to hand wheels 98 and 98a so that by rotation of either hand wheel, the connected drive pulley is turned in the same direction and motion is imparted to cable 95. Cable 95 is an endless member for reasons mentioned before. By providing separate means for controlling the lateral and fore-and-aft eccentricity of track 83, the track may be moved in either of these directions by any amount desired; and the movement imparted by actuation of either of cables 88 or 95 may be accomplished separately or simultaneously with the other motion.

It will be appreciated that the connection between annular track 83 and each of the lead screws controlling its motion is of some suitable type that permits relative motion of the track at right angles to the axis of a lead screw when produced by a lead screw disposed 90° away. As typical of such connecting means, but not necessarily limited thereto, there is shown in Figs. 8 and 9 a pin-and-slot type of connection. Lead screw 85 carries at the outer end a clevis having a pin 99 which slides within slot 100 in connector plate 101. The connector plate is attached to the inside face of track 83 with slot 100 therein extending at right angles to the axis of the front and rear lead screws 85. Thus when lead screws 85 are actuated, there is no relative motion of connector plate 101 and the lead screws. But when lead screws 93 are rotated to shift the track laterally, then pin 99 slides in slot 100 to allow lateral movement of the track relative to lead screws 85. A similar arrangement is provided for connecting lead screws 93 to track 83.

In Figs. 9 and 10 the flight direction blade 79 is shown in full lines in its neutral position. This is not necessarily a position of no lift by the airfoil but is the one in which the blade has a constant angle of attack at all times as it revolves around the fuselage.

If now the pilot turns hand wheel 91 that effects movement of front and rear lead screws 85 in a direction to move track 83 forwardly with respect to axis 14 (to the right in Fig. 9) until it occupies the position 83a shown in dotted lines in the figure, then as each blade passes that portion of the track shown in Fig. 9 it is moved radially inwardly along support arm 77. At the same time, because of the spiral cam connection between the blade and the support arm, the blade is rotated in a direction to depress the leading edge as in the position indicated in dotted lines at 76a in Figs. 9, 10 and 11. In this position the angle of attack is such that the airfoil provides a negative lift.

If, on the other hand, the control mechanism is actuated in the opposite direction, lead screw 85 is moved outwardly from the neutral position and moving with it track 83 to the other extreme position shown in dotted lines at 83b in Fig. 9. This movement of track 83 shifts each airfoil 76 radially outward as it passes over the portion of the track shown in the figure and at the same time rotates the airfoil in a direction to raise the leading edge to the position 76b of Fig. 11. At this point the lift of the airfoil is positive and reaches a maximum. Any point on the airfoil moves in a circular path eccentric to ring 12 and axis 14.

Because track 83 is a rigid member of constant diameter it is obvious that when it is moved to an eccentric position relative to axis 14, on one side of the axis the effective radius of track 83 is increased while at the opposite side the effective radius of the track is decreased. Consequently if directly ahead of axis 14 the track occupies the relative position 83b shown in Fig. 9, then directly to the rear of the axis the track occupies the position 83a. The result is that as a blade moves forward, starting from a position directly to the rear of axis 14, its angle of attack is gradually increased for 180° to a maximum and then the angle of attack gradually decreases for the next 180° of movement as the blade moves to a position directly at the rear. The blade is in the neutral position at each side or midway between the front and rear positions in which the lift is a maximum and a minimum respectively.

Briefly stated, the actuation of the manual controls to the shift track 83 to an eccentric position causes all flight directional blades to undergo a cyclic change in position in which each blade starting from a neutral position moves gradually over 90° of arc to a position of maximum lift and returns thru the next 90° to a neutral position. It then rotates to a position of minimum lift during the next 90° of its circle of revolution. Finally, during the last one-quarter revolution the blade is restored to the neutral position occupied at the beginning of the cycle. The location in the revolution of each blade around the fuselage at which it reaches a position of maximum lift is determined by the direction of eccentricity of track 83 with respect to axis 14 and ring 12; and this location is determined by the pilot by operating control wheels 91 and 98, either singly or collectively. By operating control wheel 91 alone the direction of eccentricity of the track is moved forwards or backwards with respect to axis 14; while the eccentricity is shifted laterally in one direction or the other with respect to axis 14 by manipulating control wheel 98. By operating both control wheels the eccentricity is in a direction which is the resultant of the movement of the track imposed by each of the two control wheels individually.

Operation of the control means for effecting a cyclic change in the pitch of the flight direction blades results in giving to the blades a non-uniform lift as they individually revolve around the fuselage. During one half of their revolution all of these blades exert a greater lift than during the other one-half of the revolution; and the location of the position of maximum lift is under the control of the pilot. The effect of this unbalanced lift is to tilt the fuselage so that axis 14, which is normally vertical, is no longer so but is inclined with respect to the vertical. The plane of revolution of each set of flying blades 15 and 18 is now tilted with respect to the horizontal. As a consequence, the lift supplied by flying blades 15 and 18 now has a horizontal component in the direction of the highest elevation of the planes in which these sets of blades 15 and 18 revolve. In this way the direction of flight of the helicopter is established and controlled by the pilot.

In addition to means just described for controlling the direction of flight, means for changing the heading of the aircraft is also provided. While this latter means may take any other or conventional form, a novel means is shown in the drawings, at Fig. 1. The engine 30 is placed within a housing 125 which acts as an air duct that receives air from engine-driven fan 30b and directs the air over and around the engine to cool it. The duct has a vertically extending terminal section 125a through which air flows after passing over the engine and is discharged at downwardly facing outlet 125b of the duct. Outlet opening 125b is located centrally of the underside of the fuselage and preferably co-axial with axis 14 of the aircraft, to direct the stream of air vertically downward.

The vertical run 125a of the air duct is preferably rectangular in cross-section to accommodate a pair of vanes 126 mounted to pivot about a horizontal axis and located one on either side of the axis 14. Each vane is connected by a rod 128 to control lever 127 placed adjacent the pilot's seat. By moving lever 127, the vanes can be moved to any selected position. In neutral position, the vanes lie in a common vertical plane and are parallel to the flow of air in duct 125a over the vanes. The vanes are moved equally and oppositely to an operative inclined position by manipulation of lever 127. When inclined as shown in Fig. 1, the air stream in duct 125a impinges on both vanes and exerts a horizontal force on each vane. Since the vanes are always oppositely and equally inclined to axis 14, the force so produced on each vane is equal and oppositely directed and on opposite side of axis 14 to the similar force on the other vane. Hence these two forces constitute a force couple tending to rotate the vanes, and the aircraft, about axis 14. The magnitude of the couple is determined by the inclination of the vanes for a given air flow. Such rotation changes the heading of the aircraft, permitting the pilot to face in a desired direction.

The discharge from duct 125 is located beneath the aircraft, in order to assist in lifting and flying the aircraft. The air from duct 125 prevents development of a low pressure area when in flight, which would reduce the net lift, and also assists in building up the "ground cushion" at take off and landing.

Landing gear

In order to taxi the aircraft on a landing field the same principle of tilting the fuselage to incline the plane of revolution of the flying blades to the horizontal is employed; but the flight direction blades are not utilized for this purpose. Use of the landing gear is made to tilt the aircraft and axis 14 by changing the length of at least one of the columns or struts of the landing gear.

Typical landing gear is a tricycle formation with two wheels in the front and one at the rear (Fig. 2). The forward wheels 103 are each mounted on the lower end of a strut 104 which is pivotally connected at 105 to the underside of the fuselage (Fig. 1). The rear wheel 106 is mounted on the lower end of strut 107 which is pivotally mounted at 108 to the underside of the fuselage. Forward struts 104 are preferably members of fixed length; but rear strut 107 includes a hydraulic cylinder and piston arrangement for changing the length of the strut.

This piston and cylinder is shown particularly in Fig. 12. The upper part of the strut is hollow to form hydraulic cylinder 109 and the lower part of the strut is slidably mounted to telescope into the upper part. The lower part of the strut has a piston head 110 at its upper end which divides cylinder space 109 into two parts. Hydraulic fluid under pressure can be introduced into the upper end of cylinder space 109 above piston 110 by fluid supply line 112, and into the lower end of the cylinder below piston 110 by fluid supply line 114.

Fluid is delivered under pressure by pump 115 driven by motor 116 or other suitable source of power. Fluid delivered from the pump goes to a three-position control valve 116 of any suitable type which in its neutral position shuts off both lines 112 and 114. In one position control valve 116 delivers fluid under pressure to line 112 and exhausts line 114 while in the other operating position the reverse is true, fluid under pressure being delivered to line 114 and exhausted from line 112.

When the helicopter is resting on the ground with all three wheels 103 and 106 in ground contact, the aircraft has the normal aspect indicated in Fig. 1. By proper manipulation of valve 116, fluid may be exhausted from the upper end of cylinder space 109 through line 112 and fluid supplied through line 114 to the lower end cylinder 109. Actually the weight of the helicopter is sufficient alone to force piston 110 upwardly within cylinder 109, causing strut 107 to shorten. This lowers the back side of the helicopter producing the position shown in Fig. 13 in which axis 14 is inclined to the vertical. Rotation of flying blades 15 and 18 now produces a forwardly directed component generally parallel to the ground surface which causes the aircraft to move forwardly over the ground, that is to the right viewed in Fig. 13. The strength of this horizontal component can be controlled in various ways, including control of the length of rear strut 107. Obviously, the more the strut is shortened, the greater the inclination of the planes of revolution of blades 15 and 18 to the ground and the greater the horizontal component of the lift which they produce.

The helicopter may be restored to its normal position with strut 107 extended as shown in Fig. 1 by pumping fluid under pressure through line 112 into the upper end of cylinder 109. This hydraulic fluid under pressure forces the piston downwardly with respect to the cylinder, lengthening the strut and lifting the rear end of the helicopter.

Although it is not necessary to do so, it may be found advantageous to design the landing gear of the helicopter in such a manner that the gear is retractable to decrease air resistance when the craft is airborne. For this purpose each of the landing gear struts 104 and 107 is pivotally connected at its upper end to the fuselage. Mounted on the fuselage is a plurality of fluid motors 118, one for each landing gear strut. Each motor has attached to it a crank arm 119 which is connected by a link 120 (see Fig. 12) to the associated landing gear strut. As fluid under pressure is forced through the fluid motor by motor driven pump 121, crank arm 119 is rotated in a direction to lift link 120 and pull the associated strut upwardly to a position in which it lies just under and approximately parallel to the bottom of the fuselage, as shown particularly in Fig. 12. By reversing the rotation of motor 122 driving pump 121, the direction of fluid flow through fluid motor 118 is reversed and crank 119 is rotated in the opposite direction and the landing gear strut is forced downwardly, bringing the landing wheels into position to engage the ground.

Having described a preferred embodiment of my invention, it will be apparent that various changes in the detailed construction and arrangement of parts may occur to persons skilled in the art but without departing from the spirit of my invention or the essential principles of operation thereof. Consequently, it is to be understood that the foregoing description is considered as being

I claim:

1. In an aircraft of the helicopter type, the combination comprising: a fuselage; an engine mounted in the fuselage; a plurality of flying blades mounted to rotate around the fuselage; a ring surrounding the fuselage and mounted thereon to rotate in a normally horizontal plane about a normally vertical axis, and the ring having a pair of outwardly concave surfaces that face oppositely in the direction of the axis of ring rotation; blade mounting means mounting the blades on the ring to extend outwardly therefrom; and a plurality of pairs of spaced rubber tired wheels rotatably mounted on the fuselage, the wheels of each pair engaging the concave surfaces of the ring at opposite sides of the ring to support the ring on the fuselage and to restrain it against axial or radial movement relative to the fuselage; and means drivingly connecting at least one of the wheels to the engine for rotation of the ring about the fuselage.

2. In an aircraft of the helicopter type, the combination comprising: a fuselage; an engine mounted in the fuselage; a plurality of flying blades mounted to rotate around the fuselage; a ring surrounding the fuselage and mounted thereon to rotate in a normally horizontal plane about a normally vertical axis; blade mounting means mounting the blades on the ring to extend outwardly therefrom and to rock individually about their respective longitudinal axes; manually actuated means carried on the fuselage and operatively connected to all the blades for simultaneously changing the pitch of all blades by rocking them about their individual axes; a separate automatically operated means connected to each blade for individually changing the pitch of the associated blade in response to the variations in resistance to forward rotative movement encountered by the blade; and drive means engaging the ring to rotate it about the fuselage, said drive means being connected to the engine.

3. In an aircraft of the helicopter type, the combination comprising: a fuselage; an engine mounted in the fuselage; a plurality of flying blades; a ring surrounding the fuselage and mounted thereon to rotate in a normally horizontal plane about a normally vertical axis; blade mounting means mounting the blades on the ring to rotate therewith around the fuselage and to extend outwardly from the ring, and said mounting means also mounting the blades to rock individually relative to the ring about their respective longitudinal axes; a separate automatically operated means connected to each blade to individually change the pitch of the associated blade in response to variations in resistance to forward rotative movement encountered by the blade; and drive means connected to the engine and engaging the ring to rotate it about the fuselage.

4. In an aircraft of the helicopter type, the combination comprising: a fuselage; an engine mounted in the fuselage; a ring surrounding the fuselage and mounted thereon to rotate about a normally vertical axis; a plurality of flying blades; pivot means connecting each blade individually to the ring to extend outwardly from the ring and permitting limited movement of the associated blade relative to the ring about a vertical axis and also the longitudinal axis of the blade; a separate hydraulic means at each blade operatively connected to the associated blade and operable in response to movement of the blade about the vertical axis relative to the wing for rocking the blade about its longitudinal axis to change the blade pitch; and drive means transmitting power from the engine to the ring to rotate the latter about the fuselage.

5. An aircraft as in claim 4 in which the hydraulic means includes a first hydraulic cylinder assembly connected to the blade to displace fluid from the cylinder in response to relative rearward movement of the blade about said vertical axis; a second hydraulic cylinder assembly having a relatively movable element; means connecting said element to the blade to rock the blade about its longitudinal axis in response to relative movement of the element; and fluid conduit means interconnecting the two cylinder assemblies for flow of fluid between them.

6. An aircraft as in claim 4 in which the hydraulic means at each flying blade includes a first hydraulic piston and cylinder assembly having its piston movable in response to movement of the associated flying blade about said vertical axis; a second piston and cylinder assembly having its piston operatively connected to the blade to rock the blade about its longitudinal axis in response to movement of the piston; and fluid conduit means interconnecting the two cylinders to transfer fluid from one cylinder to the other and thereby produce movement of the second piston in response to movement of the first piston.

7. In an aircraft of the helicopter type, the combination comprising: a fuselage; an engine mounted in the fuselage; a ring surrounding the fuselage and mounted thereon to rotate about a normally vertical axis; a plurality of flying blades; pivot means connecting each blade individually to the ring to rotate therewith around the fuselage and to rock about the longitudinal axis of the blade and also about a vertical axis relative to the ring; crank means attached to each blade to rock the blade; manually operated collective pitch control means mounted on the fuselage and engaging all the crank means to rock the crank means and thereby rock the blades simultaneously about their longitudinal axes; and separate hydraulic means incorporated in each said crank means and operatively connected to the associated blade for rocking the associated blade independently of the collective pitch control means in response to swinging movement of the blade about a vertical axis relative to the ring.

8. An aircraft as in claim 7 in which the hydraulic means includes a cylinder fixed relative to the crank means, a piston movable within the cylinder and relative to the crank means, and linkage transmitting relative linear motion of the piston to the blade to rock the blade about its longitudinal axis.

9. In an aircraft of the helicopter type having a fuselage and an engine mounted in the fuselage, the combination comprising: a ring surrounding the fuselage and mounted thereon to rotate about a normally vertical axis fixed with respect to the fuselage; a plurality of flying blades; universal joint means mounting the flying blades on the ring to be rotated thereby around the fuselage; a plurality of flight direction blades; and mounting means mounting the flight direction blades on the ring to be rotated thereby around the fuselage, said mounting means mounting each flight direction blade for angular motion about its longitudinal axis but holding it against angular movement relative to the ring about any other axis.

10. An aircraft as in claim 9 that also comprises manually actuated means carried on the fuselage and operatively connected to all the flight direction blades for effecting a cyclic change in the pitch of individual flight direction blades as they move around the fuselage.

11. In an aircraft of the helicopter type, the combination comprising: a fuselage; an engine mounted in the fuselage; a ring surrounding the fuselage and mounted thereon to rotate about a normally vertical axis; a plurality of flight direction blades; mounting means for each flight direction blade mounting the blade on the ring for longitudinal axial movement relative to the ring, and including means producing angular movement of the blade about the longitudinal axis of the blade in proportion to said longitudinal movement; and means operatively connected to all the flight direction blades for producing cyclic longitudinal movement of the blades as they move around the fuselage.

12. An aircraft of the helicopter type, as in claim 11 in which the means giving longitudinal movement to the flight direction blades includes an annular track normally concentric with the vertical axis of ring rotation and engaging all the flight direction blades; and means for shifting the track horizontally to an eccentric position whereby the flight direction blades are given a cyclic longitudinal movement as the ring rotates.

13. In an aircraft of the helicopter type, the combination comprising: a fuselage; an engine mounted in the fuselage; a ring surrounding the fuselage and mounted thereon to rotate about a normally vertical axis; a plurality of flight direction blades; mounting means for each flight direction blade including a fixed sleeve attached to the ring, spiral cam means interengaging the sleeve and the associated blade for effecting angular movement of the blade as the blade moves longitudinally of the sleeve, and a rod attached to the blade and extending through the sleeve to a position inwardly of the ring; and means inside the ring engaging all the rods to control longitudinal movement of the rods and blades as the ring rotates.

14. In an aircraft of the helicopter type, the combination comprising: a fuselage; a pair of vertically spaced rings coaxially and rotatably mounted on the fuselage to revolve around the fuselage about a normally vertical axis; an engine mounted on the fuselage; drive means operatively connected to said engine and engaging both rings to rotate the rings simultaneously in opposite directions; a plurality of flying blades carried by each of the rings to be rotated thereby around the fuselage; blade mounting means mounting each blade upon one of said rings for rocking movement of the blade about its longitudinal axis; crank means connected to each blade to rock the blade upon angular movement of the crank; two circular track members concentric with the rings and each engaging all of the crank means associated with one ring; and control means engaging both of said track members to shift the two tracks equally and simultaneously to effect collective control of the pitch of all blades, said control means including lead screw means moving the two track members in the direction of the axis of rotation of the rings.

15. In an aircraft of the helicopter type having a fuselage and an engine mounted thereon, the combination comprising: a plurality of flying blades; means mounting the blades on the fuselage to rotate in unison about a central vertical axis, including universal joint means at the root of each blade allowing limited motion of each blade individually about horizontal and vertical axes at the root of the blade as well as angular motion about the longitudinal axis of the blade; drive means drivingly connecting the blades to the engine; and cyclic pitch control means at each blade for individually controlling the pitch of the blade in response to swinging movement of the associated blade about the vertical axis at the root of the blade, said pitch control means including a member mounted for linear movement, means connecting said member to the associated blade to rotate the blade about its longitudinal axis in response to linear movement of said member, and means connected to said member and to the blade producing linear movement of said member in proportion to and in response to said swinging movement of the associated blade.

16. In an aircraft of the helicopter type having a fuselage and an engine mounted thereon, the combination comprising: a plurality of flying blades; means mounting the blades on the fuselage to rotate in unison about a central vertical axis, including universal joint means at the root of each blade allowing limited motion of each blade individually about horizontal and vertical axes at the root of the blade as well as angular motion about the longitudinal axis of the blade; drive means drivingly connecting the blades to the engine; and cyclic pitch control means at each blade for individually controlling the pitch of the blade in response to swinging movement of the associated blade about the vertical axis at the root of the blade, said pitch control means including a piston and rod mounted for linear movement, gear means interconnecting the rod and associated blade to rotate the blade about its longitudinal axis upon linear motion of the piston and rod, and hydraulic means interconnecting the blade and piston to produce linear movement of the piston in response to said swinging movement of the associated blade.

References Cited in the file of this patent

UNITED STATES PATENTS

| | | |
|---|---|---|
| 1,403,624 | Pescara | Jan. 17, 1922 |
| 1,493,280 | Rees | May 6, 1924 |
| 1,524,266 | Longaker | Jan. 27, 1925 |
| 1,800,470 | Oehmichen | Apr. 14, 1931 |
| 1,868,392 | Leffert | July 19, 1932 |
| 1,884,596 | Cierva | Oct. 25, 1932 |
| 1,995,460 | Pecker | Mar. 26, 1935 |
| 2,077,471 | Fink | Apr. 20, 1937 |
| 2,377,835 | Weygers | June 5, 1945 |
| 2,395,809 | Goddard | Mar. 5, 1946 |
| 2,397,489 | Jenkins | Apr. 2, 1946 |
| 2,410,459 | Platt | Nov. 5, 1946 |
| 2,461,435 | Neumann | Feb. 8, 1949 |
| 2,521,684 | Bates | Sept. 12, 1950 |

FOREIGN PATENTS

| | | |
|---|---|---|
| 405,295 | Italy | Aug. 3, 1943 |